United States Patent
Utaki

(10) Patent No.: US 9,534,516 B2
(45) Date of Patent: Jan. 3, 2017

(54) GUIDE SHOE

(71) Applicant: TSUBAKIMOTO CHAIN CO., Osaka-shi, Osaka (JP)

(72) Inventor: Akihiko Utaki, Osaka (JP)

(73) Assignee: TSUBAKIMOTO CHAIN CO., Osaka-shi, Osaka (JP)

( * ) Notice: Subject to any disclaimer, the term of this patent is extended or adjusted under 35 U.S.C. 154(b) by 0 days.

(21) Appl. No.: 14/596,537

(22) Filed: Jan. 14, 2015

(65) Prior Publication Data

US 2015/0204218 A1    Jul. 23, 2015

(30) Foreign Application Priority Data

Jan. 21, 2014 (JP) ................. 2014-008938

(51) Int. Cl.
```
F16H 7/08    (2006.01)
F01L 1/46    (2006.01)
F01L 1/02    (2006.01)
F01M 9/10    (2006.01)
F16H 7/18    (2006.01)
```

(52) U.S. Cl.
CPC ............ *F01L 1/46* (2013.01); *F01L 1/024* (2013.01); *F01M 9/10* (2013.01); *F16H 7/18* (2013.01); *F01L 2810/02* (2013.01); *F16H 2007/0872* (2013.01); *F16H 2007/0893* (2013.01); *F16H 2007/185* (2013.01)

(58) Field of Classification Search
CPC ...... F16H 2007/0872; F16H 7/18; F16H 7/08; F16H 2007/0804; F16H 2007/0974
USPC ............................................ 474/111
See application file for complete search history.

(56) References Cited

U.S. PATENT DOCUMENTS

| | | | | | |
|---|---|---|---|---|---|
| 2,355,003 | A | * | 8/1944 | McCann | B62J 31/00 184/16 |
| 5,647,811 | A | * | 7/1997 | Mott | F16H 7/08 184/16 |
| 5,720,682 | A | * | 2/1998 | Tada | F01M 9/108 184/15.1 |
| 6,889,642 | B2 | * | 5/2005 | Fink | F16H 7/08 123/90.17 |
| 7,252,609 | B2 | * | 8/2007 | Hashimoto | F16H 7/18 474/111 |
| 7,329,196 | B2 | * | 2/2008 | Konno | F16H 7/18 474/111 |
| 7,597,640 | B2 | * | 10/2009 | Markley | F16H 7/18 474/109 |

(Continued)

FOREIGN PATENT DOCUMENTS

JP    2006-242357 A    9/2006

*Primary Examiner* — Henry Liu
(74) *Attorney, Agent, or Firm* — Westerman, Hattori, Daniels & Adrian, LLP

(57) ABSTRACT

An object of the present invention is to provide a guide shoe that can prevent a shortage of lubricating oil and supply the lubricating oil onto a sliding surface of the shoe in a favorable manner. To achieve the above object, the present invention provides a guide shoe 120 that has a shoe surface 121 for slidably guiding a running chain CH. An oil guide part 124 with a pair of guide walls 124a is provided in the shoe surface 121. The pair of guide walls 124a are each formed such as to face a rear side in a chain running direction D and converge to each other toward a front side in the chain running direction D.

8 Claims, 8 Drawing Sheets

(56) References Cited

U.S. PATENT DOCUMENTS

| | | | | |
|---|---|---|---|---|
| 7,691,018 B2* | 4/2010 | Haesloop | ............ | F16H 7/0831 474/111 |
| 7,942,769 B2* | 5/2011 | Pflug | ............ | F16H 7/18 474/111 |
| 8,323,136 B2* | 12/2012 | Heinrich | ............ | F16H 7/08 474/110 |
| 8,888,628 B2* | 11/2014 | Konno | ............ | F16H 7/18 474/111 |
| 8,900,079 B2* | 12/2014 | Mori | ............ | F16H 7/18 474/111 |
| 2002/0107097 A1* | 8/2002 | Takeda | ............ | F16H 7/08 474/111 |
| 2005/0107196 A1* | 5/2005 | Konno | ............ | F16H 7/18 474/111 |
| 2006/0199689 A1* | 9/2006 | Yoshimoto | ............ | F16H 7/18 474/111 |
| 2006/0293134 A1* | 12/2006 | Markley | ............ | F16H 7/08 474/111 |
| 2006/0293136 A1* | 12/2006 | Markley | ............ | F16H 7/08 474/140 |
| 2007/0037647 A1* | 2/2007 | Markley | ............ | F16H 7/18 474/111 |
| 2007/0155555 A1* | 7/2007 | Fukata | ............ | B29C 45/1642 474/111 |
| 2009/0036241 A1* | 2/2009 | Hirayama | ............ | F16H 7/18 474/111 |
| 2009/0239692 A1* | 9/2009 | Heinrich | ............ | F16H 7/08 474/111 |
| 2012/0129636 A1* | 5/2012 | Lee | ............ | F16H 7/18 474/111 |
| 2013/0090201 A1* | 4/2013 | Mori | ............ | F16H 7/18 474/140 |
| 2013/0210566 A1* | 8/2013 | Konno | ............ | F16H 7/18 474/111 |

* cited by examiner

GUIDE SHOE

BACKGROUND OF THE INVENTION

1. Field of the Invention

The present invention relates to a guide shoe that has a shoe surface for slidably guiding a running chain.

2. Description of the Related Art

A chain guide has hitherto been known, which is incorporated in a timing system in the engine room of a car to slidably guide the chain running between sprockets and keep an appropriate chain tension (see, for example, Japanese Patent Application Laid-open No. 2006-242357).

This conventional chain guide includes a guide shoe that has a shoe surface for slidably guiding the running chain, and a base member that supports this guide shoe along the longitudinal direction of the guide.

SUMMARY OF THE INVENTION

Lubricating oil is supplied on the shoe surface during use of the conventional chain guide for the purpose of reducing friction between the surface of the guide shoe and the chain, and wear of the shoe surface. However, sometimes there is a shortage of oil or variation in the oil film thickness on the shoe surface, leading to the problem of accelerated wear of the guide shoe due to increased friction between the shoe surface and the chain.

It is also known to provide dimples, grooves, or the like in the shoe surface for the purpose of forming oil pockets in the surface of the guide shoe. While these dimples and the like can function as oil pockets, the lubricating oil held in the dimples or the like could hardly be pulled out onto the sliding shoe surface depending on the viscosity of the lubricating oil and the running speed of the chain, and could not be supplied to the sliding surface of the shoe in a favorable manner.

The present invention is directed at solving these problems and it is an object of the invention to provide a simple-structured guide shoe that can prevent a shortage of lubricating oil and supply the lubricating oil onto the sliding surface of the shoe in a favorable manner.

To solve the problems described above, the present invention provides a guide shoe that has a shoe surface for slidably guiding a running chain, including an oil guide part with a pair of guide walls on the shoe surface. The pair of guide walls each face a rear side in a chain running direction and converge to each other toward a front side in the chain running direction.

According to an aspect of the invention as set forth in claim 1, an oil guide part having a pair of guide walls that converge to each other toward the front side in the chain running direction is formed on the shoe surface, so that the lubricating oil held in oil pockets is guided by the pair of guide walls to approach each other as the chain runs, and the oil film thickness increases due to an oil pressure buildup at the wall-pair converging portion of the pair of guide walls. Friction between the shoe surface and the chain is thereby reduced, and thus the guide shoe can smoothly guide the chain and exhibit excellent wear resistance.

According to an aspect of the invention as set forth in claim 2, the distance between a plurality of wall-pair converging portions in a shoe width direction as viewed in a chain running direction is set to or smaller than the plate thickness of link plates of the chain. This ensures that each of the plurality of link plates that form the chain runs on the wall-pair converging portions of the walls where the oil film thickness is increased, so that the friction reducing effect can be successfully exploited.

According to an aspect of the invention as set forth in claim 3, each guide wall is formed as a flat surface, so that the pair of guide walls converge to each other linearly. As the lubricating oil is guided linearly toward the wall-pair converging portion of the walls, the pressure of the lubricating oil can be increased even more at the wall-pair converging portion.

According to an aspect of the invention as set forth in claim 4, the pair of guide walls are connected to each other at the wall-pair converging portion, so that the lubricating oil cannot flow anywhere out of the wall-pair converging portion, which improves the oil film forming effect at the wall-pair converging portion.

According to an aspect of the invention as set forth in claim 5, a plurality of oil guide parts are arranged in a zigzag pattern on the shoe surface, so that the oil guide parts can be provided in the shoe surface in a high density, and in particular, the distance between the plurality of wall-pair converging portions in the shoe width direction as viewed in the chain running direction can be reduced. This ensures that each of the plurality of link plates that form the chain runs on the parts where the oil film thickness is increased.

According to an aspect of the invention as set forth in claim 6, the plurality of oil guide parts are arranged side by side both in the chain running direction and in the shoe width direction, which makes the production of metal molds for the shoe surface pattern easy, i.e., reduces the burden of production of the guide shoe.

According to an aspect of the invention as set forth in claim 7, the oil guide part includes a pair of second guide walls arranged to oppose the pair of guide walls on the rear side in the chain running direction of the pair of guide walls. The pair of second guide walls each face the front side in the chain running direction and converge to each other toward the front side in the chain running direction. The pair of second guide walls formed on the rear side of the pair of guide walls can also guide the lubricating oil toward the wall-pair converging portion, so that the oil film forming effect at the wall-pair converging portion of the walls can be improved.

DESCRIPTION OF THE PREFERRED EMBODIMENTS

Hereinafter, a chain guide 100 according to the first embodiment of the present invention will be described with reference to FIG. 1 to FIG. 4.

Figure 1:
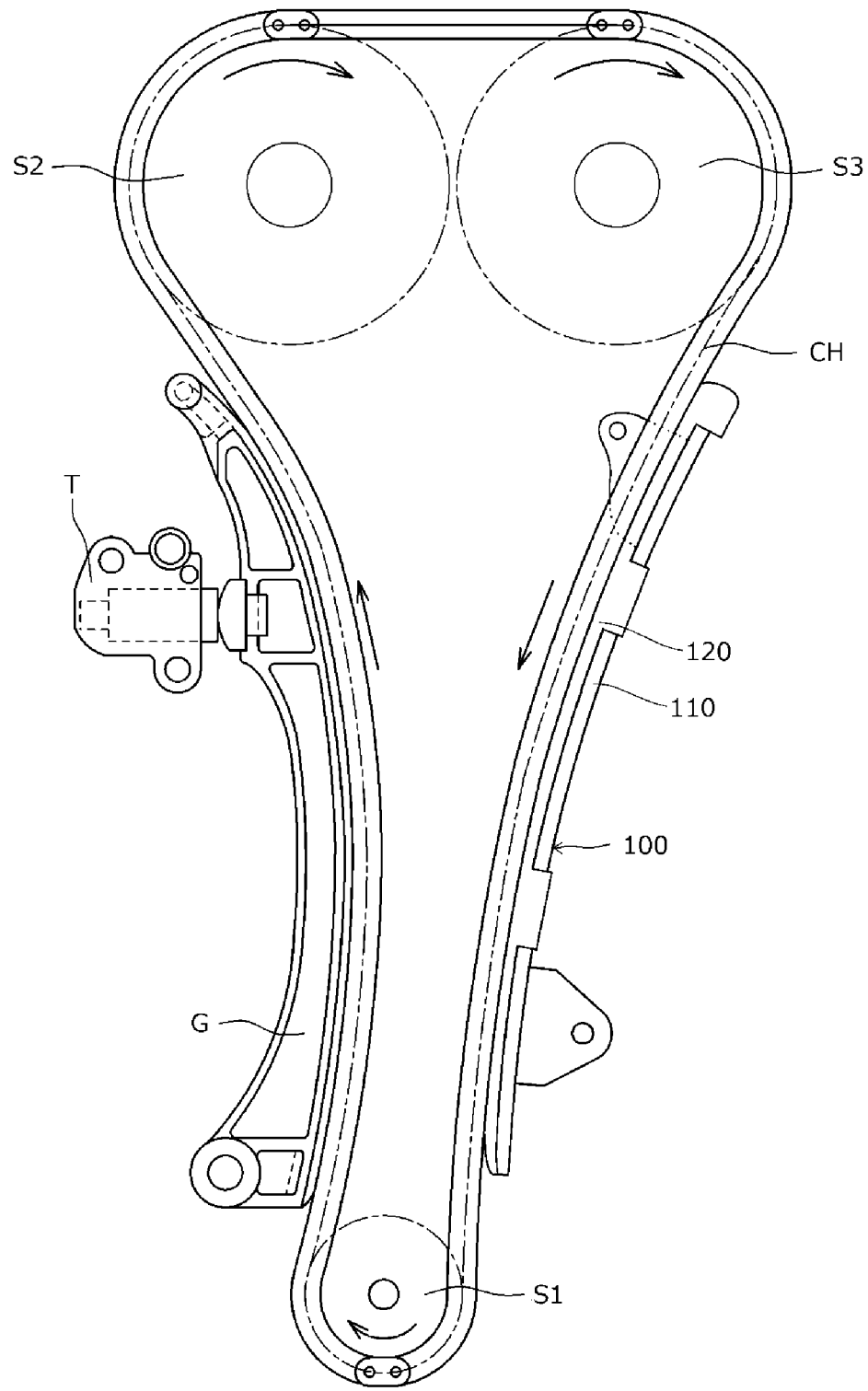
FIG. 1 is a diagram showing a form of use of a chain guide according to a first embodiment.

The chain guide 100 of the first embodiment is incorporated in a timing system in an engine room, and slidably guides a chain CH running between sprockets S1 to S3 as shown in FIG. 1 to keep an appropriate chain tension. More specifically, the chain guide 100 guides the chain CH passing over the sprockets S1, and S2 and S3 respectively provided to a crankshaft and cam shafts as shown in FIG. 1 to stabilize the running chain CH and keep the tension of the chain CH appropriately. While the chain guide 100 is configured as a fixed guide fixedly installed in the engine room in this embodiment, the chain guide 100 may be configured as a pivot guide G pivotally supported inside the engine room such as the one shown in FIG. 1 and pressed against the chain CH by a tensioner T.

Figure 2:
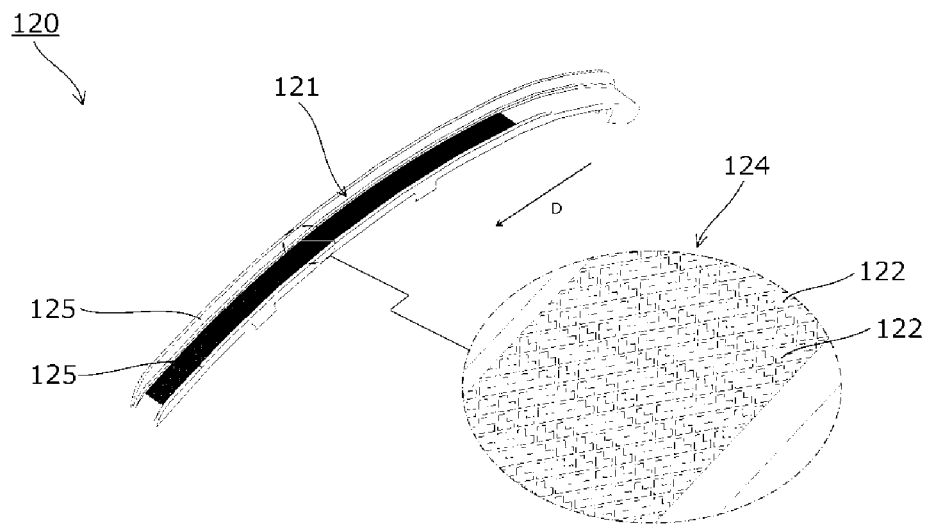
FIG. 2 is an explanatory diagram showing a guide shoe according to the first embodiment.

The chain guide 100 includes, as shown in FIG. 1 and FIG. 2, a guide shoe 120 for slidably guiding the running chain CH, and a metal base member 110 that supports the guide shoe 120 along a chain running direction (longitudinal direction of the guide) D. The base member 110 is fixed to an engine block (not shown) to which the base member is to be mounted.

Figure 3:
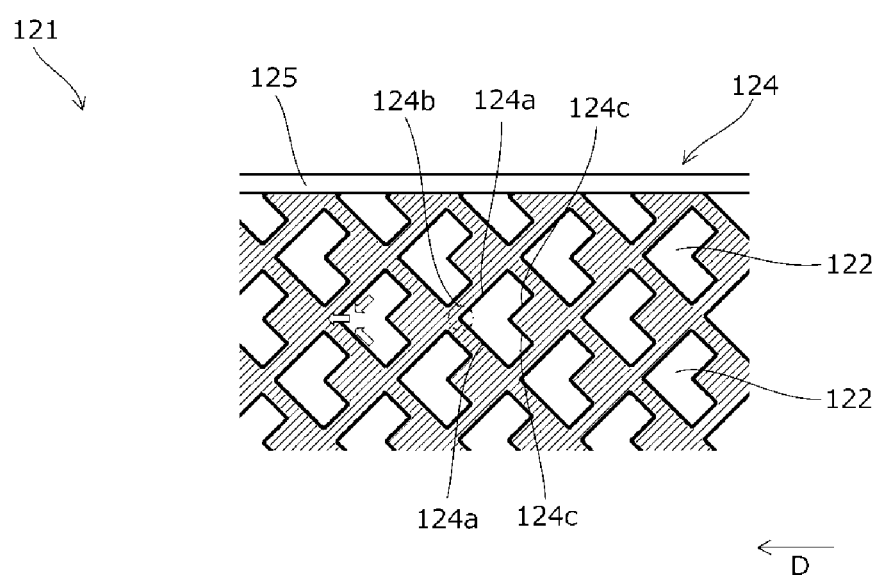
FIG. 3 is an explanatory diagram showing a shoe surface according to the first embodiment.

The guide shoe 120 is made of a synthetic resin material and has a shoe surface 121 extending along the chain running direction D on the side that faces the engine room, and guide sections 125 on both sides in a width direction of the guide shoe 120. A plurality of diagonal L-shaped indentations 122 are formed in a zigzag pattern in the shoe surface 121 as shown in FIG. 2 and FIG. 3, i.e., a plurality of oil guide parts 124 are formed in a zigzag pattern on the shoe surface 121. In this embodiment, protruded parts on the shoe surface 121 (where no indentations 122 are formed) function as the sliding surface with the chain CH, while the recessed parts in the shoe surface 121 (indentations 122) function as oil pockets.

Each oil guide part 124 has a pair of guide walls 124a that are inner wall faces on the front side of the indentation 122, a wall-pair converging portion 124b where the pair of guide walls 124a converge to each other, and a pair of second guide walls 124c that are inner wall faces on the rear side of the indentation 122, as shown in FIG. 3.

Each guide wall 124a is formed as a flat surface and faces the rear side in the chain running direction D as shown in FIG. 3. The pair of guide walls 124a extend diagonally to the chain running direction D toward the front side of the chain running direction D such as to converge and connect to each other at the wall-pair converging portion 124b.

Each second guide wall 124c is formed as a flat surface, faces the front side in the chain running direction D, and opposes each guide wall 124a, as shown in FIG. 3. The pair of second guide walls 124c extend diagonally to the chain running direction D toward the front side of the chain running direction D such as to converge and connect to each other.

Figure 4:
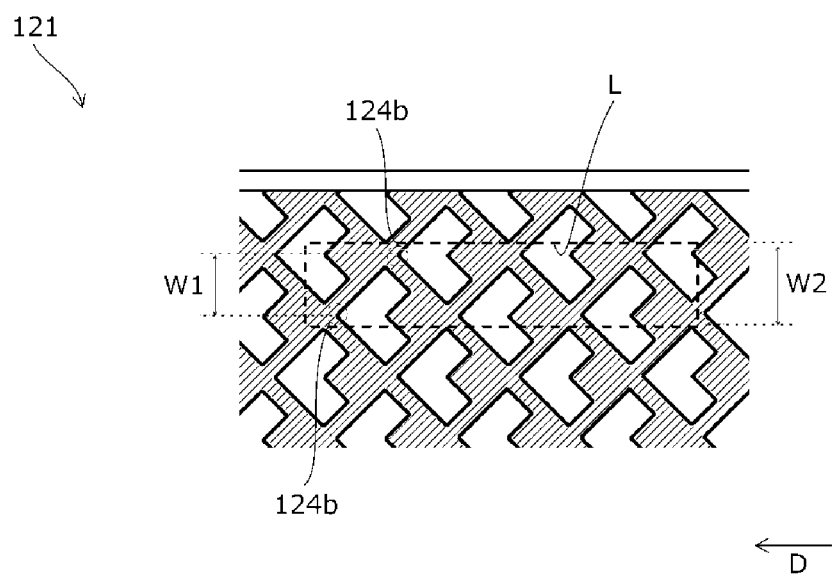
FIG. 4 is a diagram for explaining the distance between wall-pair converging portions of guide walls in the first embodiment.

As viewed in the chain running direction D, the distance W1 in the width direction of the shoe between the plurality of wall-pair converging portions 124b is set to or smaller than the plate thickness W2 of link plates L of the chain CH, as shown in FIG. 4.

Next, a modification of the first embodiment will be described with reference to FIG. 5.

Figure 5:
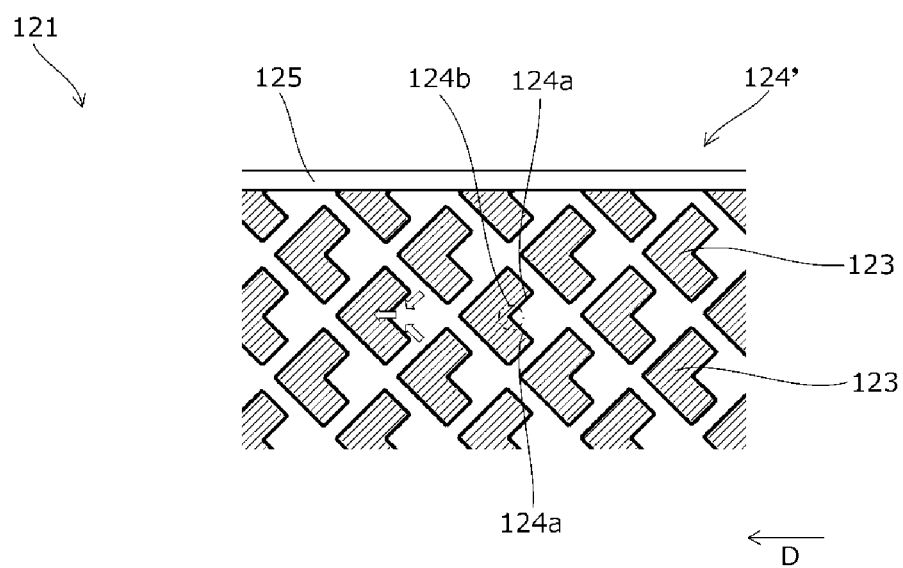
FIG. 5 is an explanatory diagram showing a shoe surface according to a modification of the first embodiment.

The difference between the first embodiment shown in FIG. 3 and the modification shown in FIG. 5 is that the concavity and convexity on the shoe surface 121 are inverted. More specifically, the indentations 122 in the first embodiment are replaced with protrusions 123. In this modification, protruded parts on the shoe surface 121 (protrusions 123) function as the sliding surface with the chain CH, while the recessed parts in the shoe surface 121 (where no protrusions 123 are formed) function as oil pockets.

In the modification shown in FIG. 5, each oil guide part 124' has a pair of guide walls 124a that are outer wall faces on the rear side of the protrusion 123, and a wall-pair converging portion 124b where the pair of guide walls 124a converge to each other. Other configurations of the guide walls 124a and wall-pair converging portions 124b in the modification shown in FIG. 5 are the same as those of the first embodiment.

Next, a chain guide 200 according to the second embodiment will be described with reference to FIG. 6. The second embodiment is basically the same as the previously described first embodiment except for some parts. Therefore, elements of the second embodiment that are identical to those of the first embodiment denoted by numerals beginning with "1" herein and in the drawings will be numbered the same but beginning with "2" instead of "1", and will not be described again.

Figure 6:
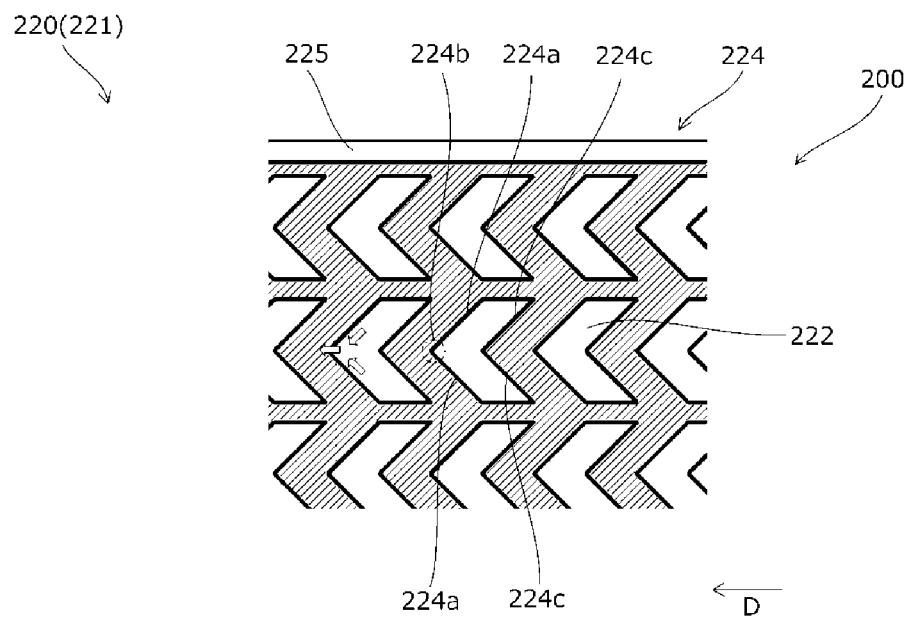
FIG. 6 is an explanatory diagram showing a shoe surface according to a second embodiment.

In the chain guide 200 of the second embodiment, as shown in FIG. 6, a plurality of diagonal L-shaped indentations 222 are arranged side by side in the chain running direction D and in the shoe width direction in the shoe surface 221, i.e., a plurality of oil guide parts 224 are formed side by side both in the chain running direction D and in the shoe width direction in the shoe surface 221.

The oil guide part 224 includes a pair of guide walls 224a, a wall-pair converging portion 224b, and a pair of second guide walls 224c, as shown in FIG. 6. The configurations of various parts of these oil guide parts 224 are the same as those of the first embodiment.

Next, a modification of the second embodiment will be described with reference to FIG. 7.

Figure 7:
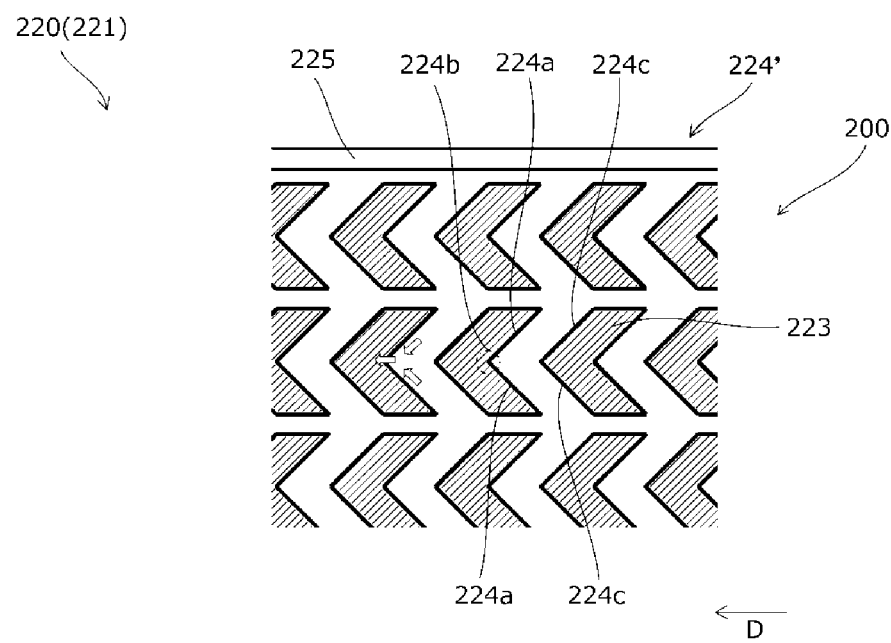
FIG. 7 is an explanatory diagram showing a shoe surface according to a modification of the second embodiment.

The difference between the second embodiment shown in FIG. 6 and the modification shown in FIG. 7 is that the concavity and convexity on the shoe surface 221 are inverted. More specifically, the indentations 222 in the second embodiment are replaced with protrusions 223.

In the modification shown in FIG. 7, each oil guide part 224' has a pair of guide walls 224a that are outer wall faces on the rear side of the protrusion 223, a wall-pair converging portion 224b where the pair of guide walls 224a converge to each other, and a pair of second guide walls 224c that are outer wall faces on the front side of the protrusion 223 that follows after the protrusion 223 formed with the guide walls 224a. The configurations of various parts of these oil guide parts 224 are the same as those of the first embodiment.

Next, a chain guide 300 according to the third embodiment will be described with reference to FIG. 8. The third embodiment is basically the same as the previously described first embodiment except for some parts. Therefore, elements of the third embodiment that are identical to those of the first embodiment denoted by numerals beginning with "1" herein and in the drawings will be numbered the same but beginning with "3" instead of "1", and will not be described again.

Figure 8:
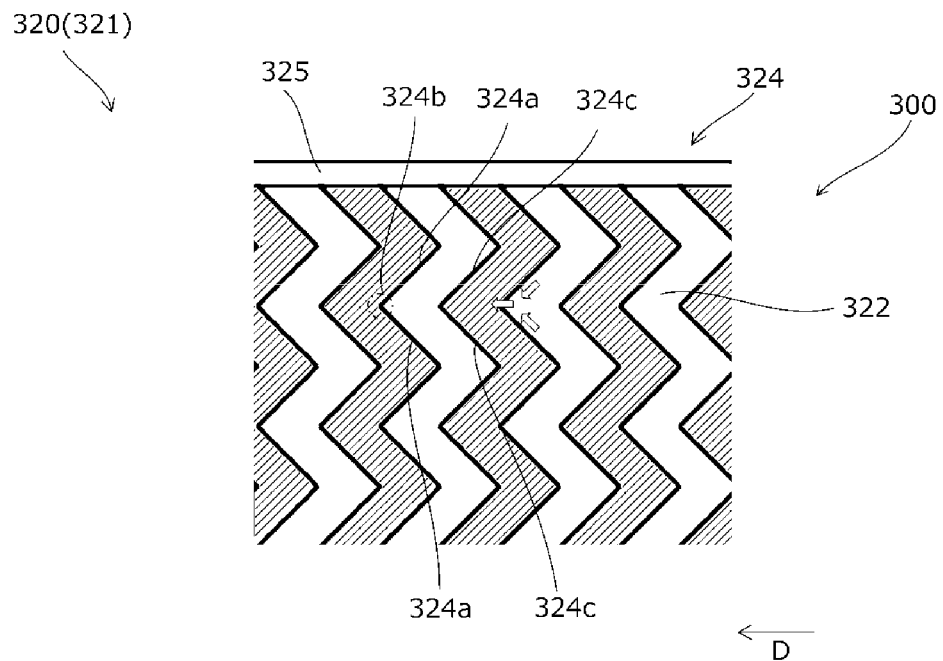
FIG. 8 is an explanatory diagram showing a shoe surface according to a third embodiment.

In the chain guide 300 of the third embodiment, as shown in FIG. 8, a plurality of zigzag indentations 322 extending along the width direction of the shoe are arranged side by side in the chain running direction D in the shoe surface 321, i.e., a plurality of oil guide parts 324 are formed side by side both in the chain running direction D and in the shoe width direction on the shoe surface 321.

Each oil guide part 324 in the chain guide 300 has a pair of guide walls 324a that are inner wall faces on the front side of the indentation 322, a wall-pair converging portion 324b where the pair of guide walls 324a converge to each other, and a pair of second guide walls 324c that are inner wall faces on the rear side of the indentation 322, as shown in FIG. 8. The configurations of various parts of these oil guide parts 324 are the same as those of the first embodiment.

Next, a chain guide 400 according to the fourth embodiment will be described with reference to FIG. 9. The fourth embodiment is basically the same as the previously described first embodiment except for some parts. Therefore, elements of the fourth embodiment that are identical to those of the first embodiment denoted by numerals beginning with "1" herein and in the drawings will be numbered the same but beginning with "4" instead of "1", and will not be described again.

Figure 9:
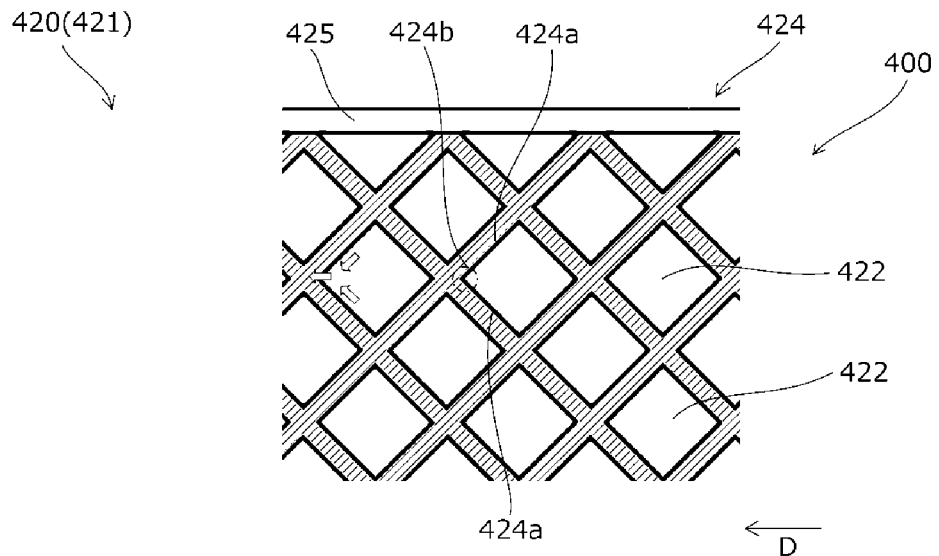
FIG. 9 is an explanatory diagram showing a shoe surface according to a fourth embodiment.

In the chain guide 400 of the fourth embodiment, as shown in FIG. 9, a plurality of diamond shaped indentations 422 are formed in a zigzag pattern in the shoe surface 421 with their diagonal lines oriented along the chain running direction D (and the width direction of the shoe), i.e., a plurality of oil guide parts 424 are formed in a zigzag pattern on the shoe surface 421.

Each oil guide part 424 has a pair of guide walls 424a that are inner wall faces on the front side of the indentation 422, and a wall-pair converging portion 424b where the pair of guide walls 424a converge to each other, as shown in FIG. 9. The configurations of various parts of these oil guide parts 424 are the same as those of the first embodiment.

Next, a modification of the fourth embodiment will be described with reference to FIG. 10.

Figure 10:
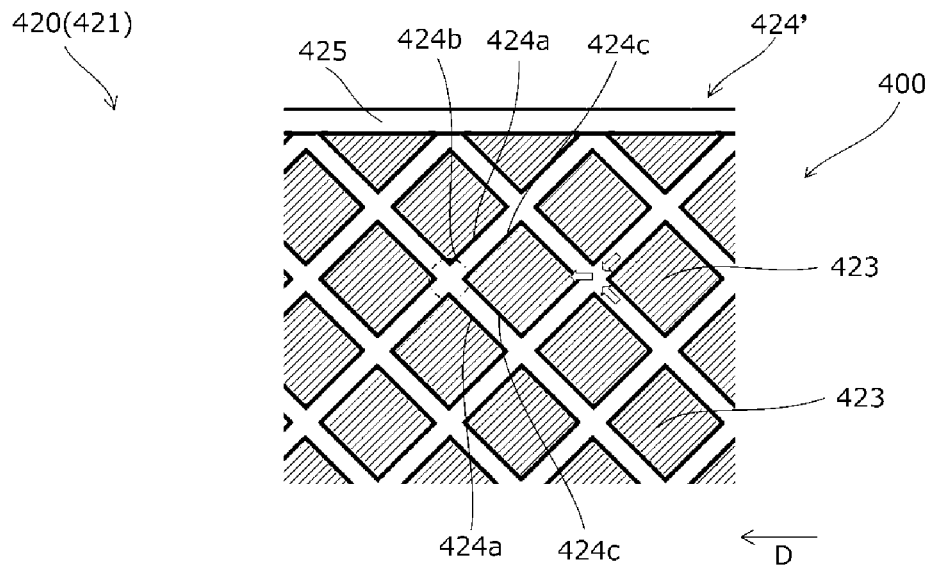
FIG. 10 is an explanatory diagram showing a shoe surface according to a modification of the fourth embodiment.

The difference between the fourth embodiment shown in FIG. 9 and the modification shown in FIG. 10 is that the concavity and convexity on the shoe surface 421 are inverted. More specifically, the indentations 422 in the fourth embodiment are replaced with protrusions 423.

In the modification shown in FIG. 10, each oil guide part 424' has a pair of guide walls 424a, a wall-pair converging portion 424b where the pair of guide walls 424a converge to each other, and a pair of second guide walls 424c. The pair of guide walls 424a are the outer wall faces on the rear side of the two protrusions 423 adjacent each other in the shoe width direction, while the second guide walls 424c are the outer wall faces on the front side of the protrusion 423 that follows after the aforementioned two protrusions 423. In this modification, the pair of guide walls 424a do not connect to each other at the wall-pair converging portion 424b. The configurations of other parts of these oil guide parts 424 are the same as those of the first embodiment.

Figure 11:
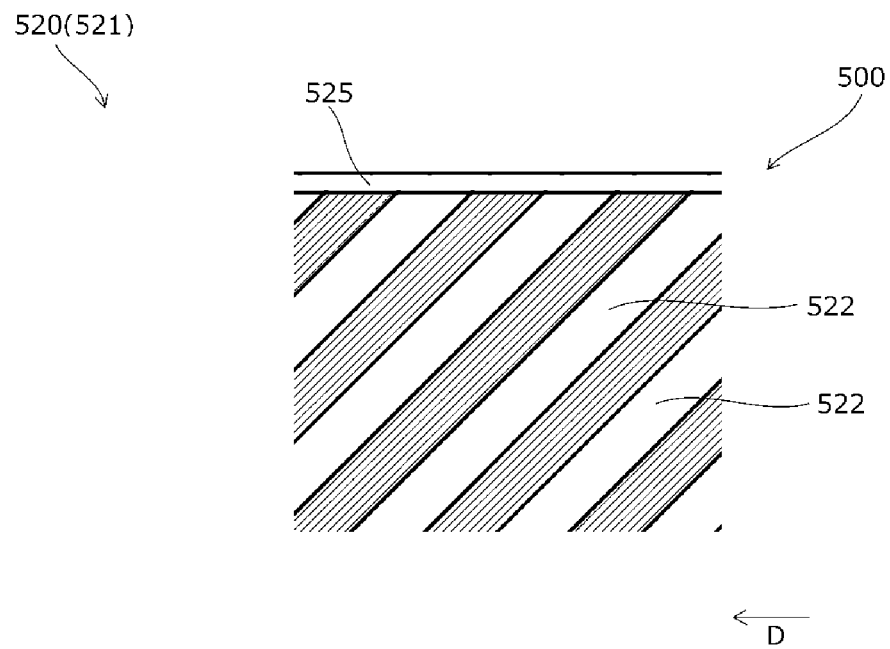
FIG. 11 is an explanatory diagram showing a shoe surface according to a first reference example.

Next, a chain guide 500 according to a first reference example will be described with reference to FIG. 11.

The chain guide 500 of the first reference example has a plurality of stripe indentations 522 extending side by side diagonally both to the chain running direction D and shoe width direction in the shoe surface 521.

Figure 12:
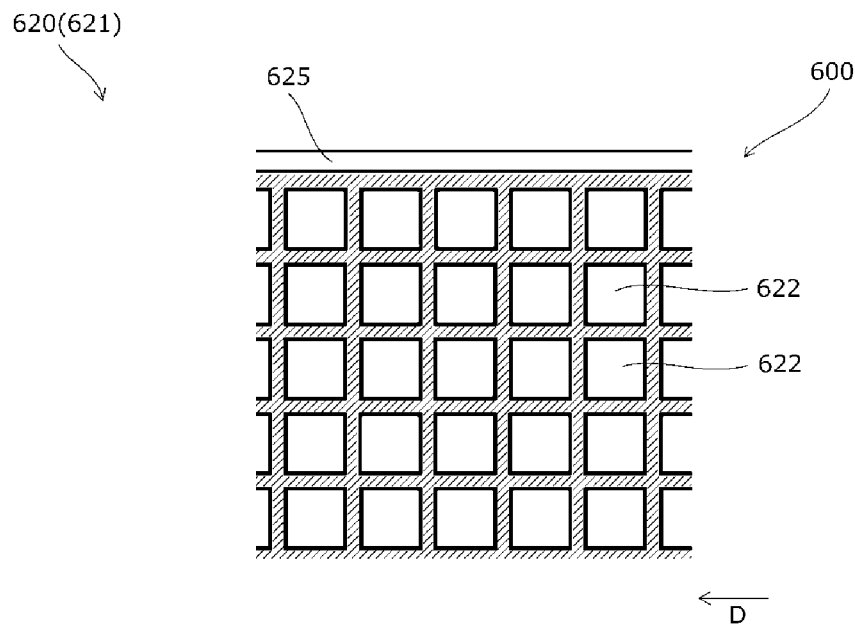
FIG. 12 is an explanatory diagram showing a shoe surface according to a second reference example.

Next, a chain guide 600 according to a second reference example will be described with reference to FIG. 12.

In the chain guide 600 of the second reference example, a plurality of square indentations 622 are arranged side by side in the chain running direction D and shoe width direction in the shoe surface 621, with their sides oriented along the chain running direction D (and the shoe width direction).

Figure 13:
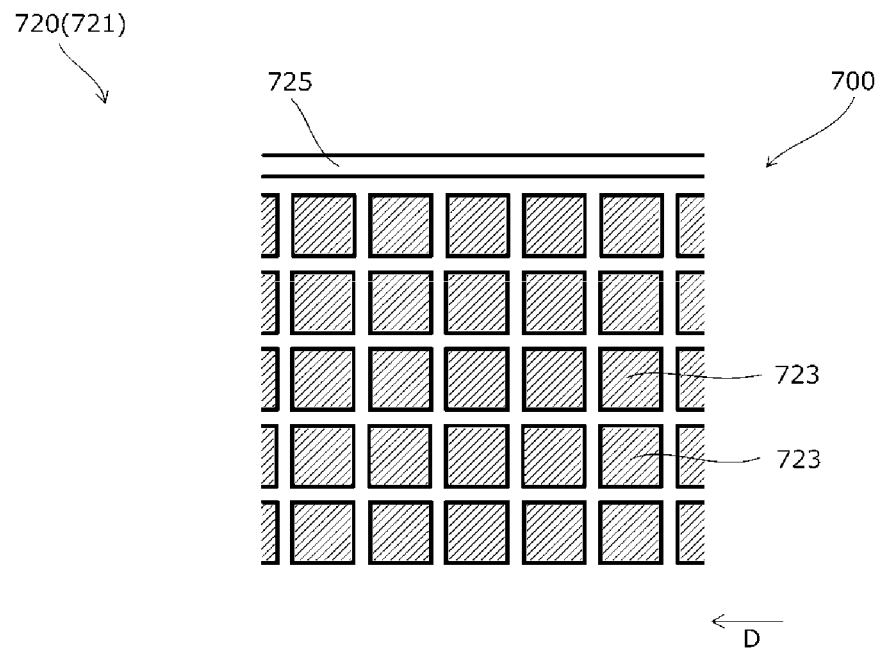
FIG. 13 is an explanatory diagram showing a shoe surface according to a third reference example.

Next, a chain guide 700 according to a third reference example will be described with reference to FIG. 13.

In the chain guide 700 of the third reference example, a plurality of square protrusions 723 are arranged side by side in the chain running direction D and shoe width direction on the shoe surface 721, with their sides oriented along the chain running direction D (and the shoe width direction).

Figure 14:
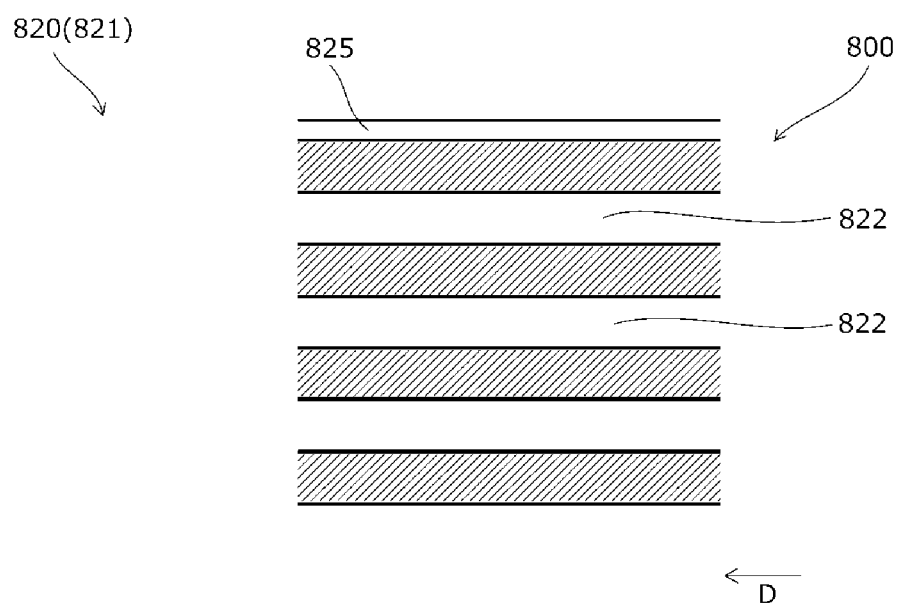
FIG. 14 is an explanatory diagram showing a shoe surface according to a fourth reference example.

Next, a chain guide 800 according to a fourth reference example will be described with reference to FIG. 14.

The chain guide 800 of the fourth reference example has a plurality of stripe indentations 822 extending along the chain running direction D and arranged side by side in the shoe width direction in the shoe surface 821.

While the guide wall (and second guide wall) in the embodiments and modifications described above are formed as flat surfaces, specific forms of the guide wall (and second guide wall) are not limited to this. For example, the guide wall (and second guide wall) may be formed as a convex or concave curved surface.

The indentations or protrusions in the shoe may have any shapes and arrangements as long as pairs of guide walls are formed such as to converge to each other toward the front side of the chain running direction.

While the oil guide parts are formed over the entire area of the shoe surface in the width direction in the embodiments described above, the oil guide parts may be formed only in limited areas in the width direction of the shoe, e.g., areas that make sliding contact with link plates of the chain.

The material of the guide shoe may be selected from known suitable materials in accordance with various conditions such as friction resistance, rigidity, durability, formability, cost, and so on. Synthetic resin materials are particularly suitable.

The material of the base member may be selected from known suitable metal materials in accordance with various conditions such as rigidity, durability, formability, cost, and so on.

The guide shoe and the base member may be formed integral with each other.

Various configurations of the embodiments and modifications shown above may be freely combined to form other chain guides.

What is claimed is:
1. A guide shoe having a shoe surface for slidably guiding a running chain, comprising:
   an oil guide part having a pair of guide walls on the shoe surface,
   the pair of guide walls each being formed such as to face a rear side in a chain running direction and converge to each other toward a front side in the chain running direction,
   wherein the oil guide part is formed in plurality both in the chain running direction and in a shoe width direction on the shoe surface,
   each of the oil guide parts has a wall-pair converging portion where the pair of guide walls converge to each other, and a distance between the plurality of wall-pair converging portions in the shoe width direction as viewed in the chain running direction is set to or smaller than a plate thickness of link plates of the chain.

2. The guide shoe according to claim 1, wherein the pair of guide walls forming the oil guide part are each formed as a flat surface.

3. The guide shoe according to claim 1, wherein the pair of guide walls forming the oil guide part are connected to each other at a wall-pair converging portion.

4. The guide shoe according to claim 1, wherein the oil guide part is provided in plurality, and the plurality of oil guide parts are arranged in a zigzag pattern on the shoe surface.

5. The guide shoe according to claim 1, wherein the oil guide part is formed in plurality on the shoe surface, and
the plurality of oil guide parts are arranged side by side both in the chain running direction and in a shoe width direction.

6. The guide shoe according to claim 1, wherein the oil guide part includes a pair of second guide walls arranged to oppose the pair of guide walls on a rear side in the chain running direction of the pair of guide walls, and
the pair of second guide walls are each formed such as to face the front side in the chain running direction and converge to each other toward the front side in the chain running direction.

7. A guide shoe having a shoe surface for slidably guiding a running chain, comprising:
an oil guide part having a pair of guide walls on the shoe surface,
the pair of guide walls each being formed such as to face a rear side in a chain running direction and converge to each other toward a front side in the chain running direction,
wherein the oil guide part is provided in plurality, and the plurality of oil guide parts are arranged in a zigzag pattern on the shoe surface.

8. A guide shoe having a shoe surface for slidably guiding a running chain, comprising:
an oil guide part having a pair of guide walls on the shoe surface,
the pair of guide walls each being formed such as to face a rear side in a chain running direction and converge to each other toward a front side in the chain running direction,
wherein the oil guide part includes a pair of second guide walls arranged to oppose the pair of guide walls on a rear side in the chain running direction of the pair of guide walls, and
the pair of second guide walls are each formed such as to face the front side in the chain running direction and converge to each other toward the front side in the chain running direction.

* * * * *